Feb. 22, 1949.    D. THOMAS    2,462,438
TAP EXTRACTOR
Filed June 13, 1945    3 Sheets-Sheet 1

INVENTOR.
Donald Thomas
BY Thos. S. Donnelly
His attorney

Feb. 22, 1949.  D. THOMAS  2,462,438
TAP EXTRACTOR
Filed June 13, 1945  3 Sheets-Sheet 2

INVENTOR.
Donald Thomas
BY Thos. L. Donnelly
His Attorney

Feb. 22, 1949.                    D. THOMAS                    2,462,438
                                 TAP EXTRACTOR
Filed June 13, 1945                                          3 Sheets-Sheet 3

INVENTOR.
Donald Thomas
BY Thos. Donnelly
His attorney

Patented Feb. 22, 1949

2,462,438

UNITED STATES PATENT OFFICE 2,462,438

TAP EXTRACTOR

Donald Thomas, Detroit, Mich., assignor to Clinton Machine Company, Clinton, Mich., a corporation of Michigan Application June 13, 1945, Serial No. 599,213

7 Claims. (Cl. 172—126)

My invention relates to a new and useful improvement in a tap extractor, and the structural features embodied in the device as illustrated. The type of tap extractor with which the present invention is particularly adapted is that type in which a reciprocating contact member is used for engaging the tap periodically. When a tap, drill, or the like has been broken in a work-piece, one method of removing the same is to ground the work-piece to one end of an arc welding machine and to periodically contact the broken tap or drill with a contact member which is connected to the other end of the welding machine. By periodically contacting the broken tap or drill and then disengaging the same with the contact member an electric arc is established and broken. This electric arc will disintegrate or burn out the broken tap or other article which it is desired to remove. However, it will sometimes be important that the work-piece be protected from excessive heat and from this end it is desirable that a cooling fluid be directed against the tap or drill while the disintegrating operation is being carried on.

To effect the reciprocating, a solenoid construction is resorted to, the core of the solenoid being the reciprocating member to which the contacting member or electrode is connected. In the present invention it is intended that the windings of the solenoid shall be of tubular material, preferably copper. This copper tubing is wound spirally to provide the necessary windings and also to provide a coil spring and it is an object of the present invention to provide a structure in which a tubular winding for a solenoid may be provided to also form a spring.

When the solenoid is energized, the core will be drawn upwardly so as to retract the electrode or contact member away from the work-piece sufficiently to break the arc. When this happens the solenoid will be de-energized and the spring windings which have been placed under tension will serve to move the contact member again toward the work-piece so that the arc will be formed. It has been found that in operating such a machine it is sometimes desirable that the movement be varied and that the tension of the spring should be varied. It is an object of the invention to provide a structure in which the tension of the spring may be adjusted so as to effect the variations desired.

Another object of the invention is the provision in a structure of this type of a solenoid having a spring winding of the class described, fixed stationary adjacent one end and connected at its opposite end to the movable core and provided with a movable means for varying the compression of the spring.

Another object of the invention is the provision of a simple and compact supporting structure for supporting the solenoid and delivering a cooling fluid through the solenoid windings.

Other objects will appear hereinafter.

It is recognized that various modifications and changes may be made in the detail of structure illustrated without departing from the invention and it is intended that such variations and changes shall be encompassed by the claims which form a part hereof.

Forming a part of this specification are drawings in which.

Figure 1:
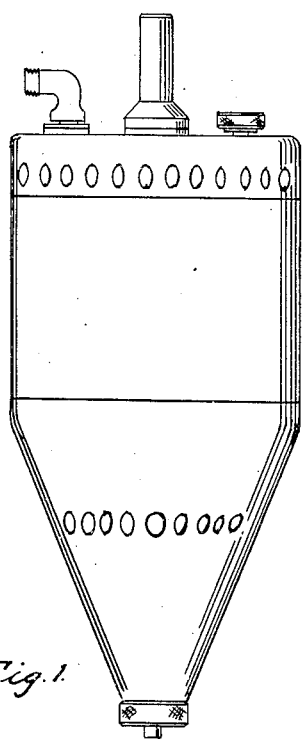
Fig. 1 is a side elevation.
Figure 4:
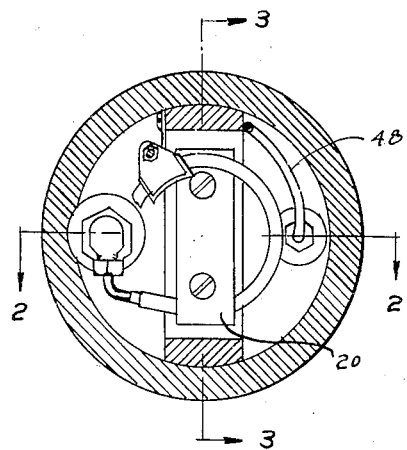
Fig. 4 is a sectional view taken on line 4—4 of Fig. 2, slightly reduced.
Figure 6:
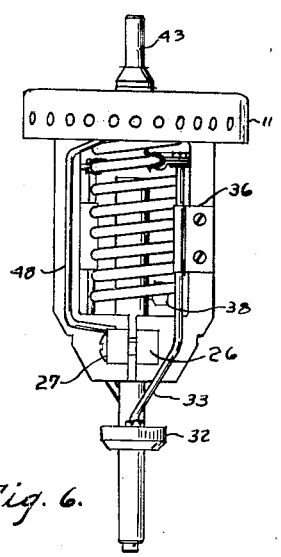
Fig. 6 is a side elevational view of the invention reduced in size with the middle and lower section of the housing and other parts removed.
Figure 5:
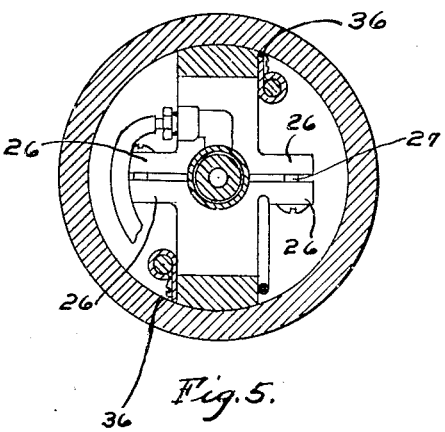
Fig. 5 is a sectional view taken on line 5—5 of Fig. 2, slightly reduced.
Figure 2:
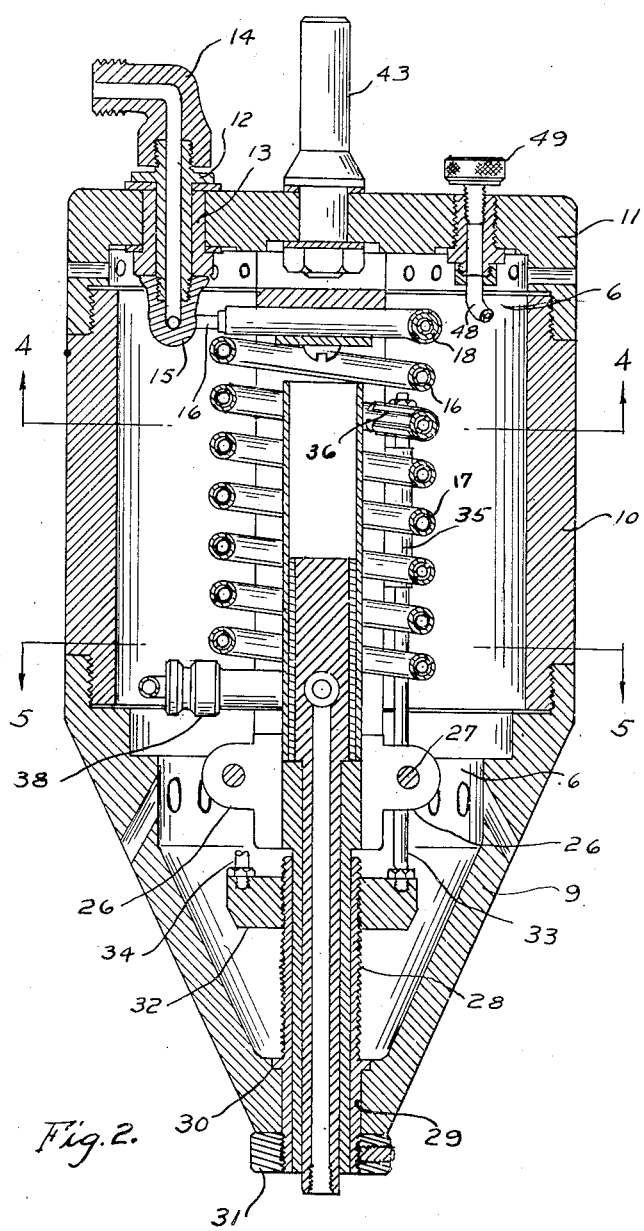
Fig. 2 is a longitudinal central sectional view of the invention taken on line 2—2 of Fig. 4.
Figure 3:
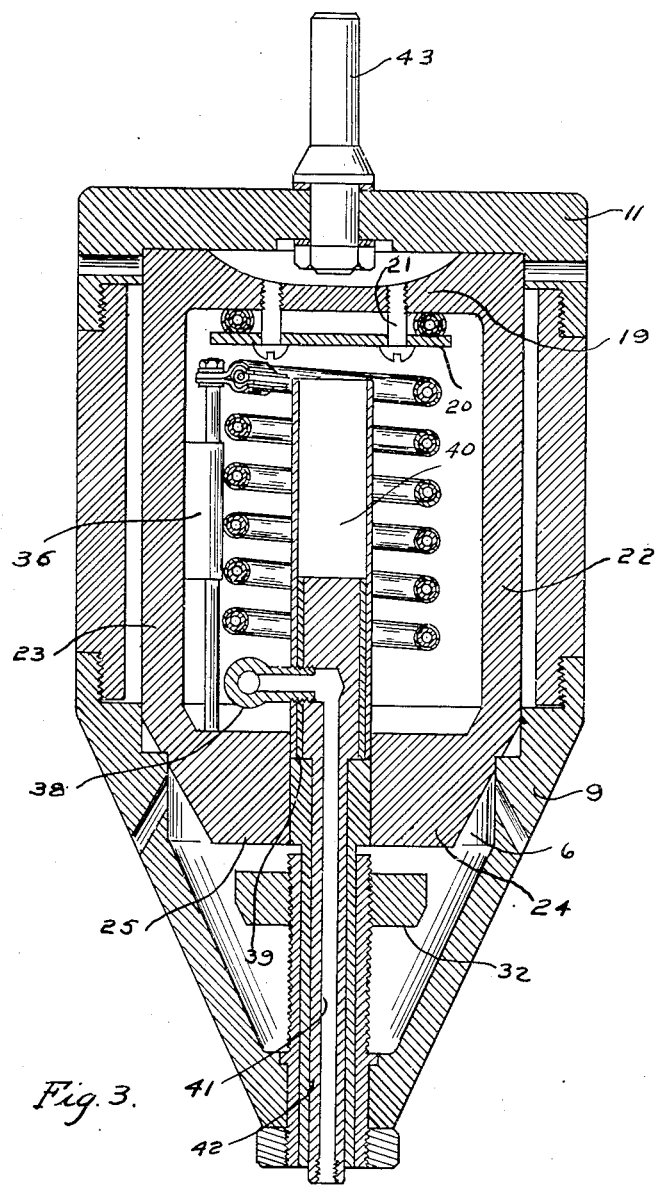
Fig. 3 is a longitudinal central sectional view taken on line 3—3 of Fig. 4.

As shown in the drawings I have provided a housing embodying a lower section 9, a middle section 10, and a top 11, which are screwed together as shown clearly in Fig. 2 to provide a housing. Mounted in the top 11 is a metallic nipple 12, insulated from the top 11 by the fiber bushing 13. A fitting 14, is threaded onto the nipple 12 to provide a means for connection to a fluid conductor which will also serve as an electric conductor. A fitting 15 is secured to the lower end of the nipple 12 and connected to the copper tube 16, which is wound upon itself to provide the solenoid windings. This copper tube 16, is encased in a sheathing 17 of suitable insulating material. The upper end of the tube 16, is encased in an additional sheathing or tube of insulating material 18 and this portion of the winding is clamped to the bar 19, of a supporting frame by means of the plate 20, and screws 21. It is preferred to form the plate 20 from a suitable insulating material such as fiber or the like.

Projecting downwardly from the opposite end of the bar 19, are supporting legs 22 and 23 which are turned inwardly at their lower ends to provide head portions 24 and 25, each of which is provided with the aligning lugs 26, through which bolts 27 may be projected to secure the parts together.

Clamped between the head portions 24 and 25 is a guide tube 28. Carried by the lower section 9, is a rotatable tube or sleeve 29, which is provided with a peripheral flange 30, bearing against the inner portion of the section 9. Secured to the outer end of the tube or sleeve 29, and fixed thereto, is a nut 31, whereby the tube 29 may be rotated.

The inner portion of the tube 29 is threaded and threads into a collar 32. Secured to this collar and projecting upwardly therefrom, are rigid rods 33 and 34, each of which is slidably projected through a knuckle 35 formed on a bracket 36 mounted on the legs 22 and 23.

Carried on the upper end of each of these rods 33 and 34 is a clip 35 which serves to clamp against a strip 36, of insulating material positioned around one of the windings of the coil. The construction is such that as the collar 32 is drawn downwardly toward the lower end of the housing 39, the coil will be compressed at that portion which lies below the clamping clips 35. This movement of the collar 32 may be effected by rotating the tube 29 by means of the nut 31. Thus it is believed obvious that the tension of the spring may be varied or adjusted.

A fitting 38, is connected to the lower end of the windings and also to the passage 39 formed in the slidable core 40, so that the tubular winding is thus brought into communication with the passage 41 formed in the member 42 which forms a continuation of the core 40 and which serves to carry the electrode or contact member. Thus cooling fluid may be delivered through the windings at the same time that the windings serve as electric conductors and this cooling fluid may be delivered to the point of contact so that an overheating of the work-piece from which the tap or the like is being removed may be avoided.

Secured to the top 11, and projecting upwardly therefrom, is a stem 43 whereby the structure may be attached to a suitable support such as the chuck of the drill press or the like, so that the housing may be raised and lowered, relative to the work-piece, at will. In operation, when the housing has been lowered to the proper position relative to the work-piece, the current and cooling fluid would be turned on and when the contact member would approach the work-piece the proper distance an electric arc would be established which would close the circuit through the solenoid. When the solenoid is energized, the core 40 would be snapped upwardly against the compression of the spring windings. In this movement the arc would be broken and the solenoid would be de-energized. The spring windings would be placed under compression and would immediately move the core 40 downwardly so that the operation would be repeated.

Through the adjustment of the tension of the spring windings the speed of movement of the core toward contact position may be varied and the tension of the spring generally adjusted. By adjusting the tension of the spring in this manner, it becomes possible to operate the structure with varying amounts of current supply and the sensitiveness of the device is considerably enhanced.

A suitable conduit 48, having the closure 49 is provided whereby lubricant may be delivered to that portion of the extension 42, which slides through the guide sleeve 28.

What I claim as new is:

1. In a solenoid, an electric winding of resilient material wound to provide a spring coil; a supporting structure for said coil; a reciprocatory core positioned within said coil and reciprocated in one direction, upon the energizing of said coil; means for connecting one end of said coil to said core for movement in unison therewith; and means engaging said coil adjacent its opposite end and movable for compressing and distending said coil, depending upon the direction of movement, for varying the tension of said coil.

2. In a solenoid, an electric winding of resilient material wound to provide a coil spring; a supporting structure connected to said winding adjacent one end; a core slidably mounted in said winding and movable in one direction upon the energizing of said coil, the opposite end of said coil being connected to and movable in unison with said core; and slidable means carried by said supporting structure and movable in one direction for compressing said coil and in the opposite direction for distending the same for varying the tension thereof.

3. The combination of, a supporting structure; a solenoid coil of tubular resilient material wound to provide a coil spring; means for connecting one end of said coil to said structure; a core slidably mounted in said coil and movable in one direction upon the energizing of said coil; means for connecting the opposite end of said coil to said core, said core being moved in the opposite direction by the resiliency of said coil upon de-energizing of the same.

4. The combination of, a supporting structure; a solenoid coil of tubular resilient material wound to provide a coil spring; means for connecting one end of said coil to said structure; a core slidably mounted in said coil and movable in one direction upon the energizing of said coil; means for connecting the opposite end of said coil to said core, said core being moved in the opposite direction by the resiliency of said coil upon de-energizing of the same; and means for adjusting the tension of said coil.

5. The combination of, a supporting structure; a solenoid coil of tubular resilient material wound to provide a coil spring; means for connecting one end of said coil to said structure; a core slidably mounted in said coil and movable in one direction upon the energizing of said coil; means for connecting the opposite end of said coil to said core, said core being moved in the opposite direction by the resiliency of said coil upon de-energizing of the same; and means for adjusting the tension of said coil; and means for connecting said coil to a fluid conductor.

6. In a device of the class described, a supporting structure; a solenoid coil of tubular, resilient material wound to provide a coil spring; a core slidably mounted within said coil; means for connecting one end of said coil to said supporting structure; means for connecting said coil, adjacent its opposite end, to said core, said core being movable in one direction, against the resiliency of said coil, upon the energizing of said coil and movable in the opposite direction, in response to the pressure of said coil, upon the de-energizing of said coil; means slidably mounted on said supporting structure for varying the tension of said coil; and means carried by said supporting structure for actuating said varying means.

7. A device of the class described comprising: a supporting structure; a solenoid coil of resilient tubular material wound to form a coil spring; means for connecting one end of said coil to said structure; a core slidably mounted in said coil and having a passage formed adjacent one end thereof; means for connecting the opposite end of said coil to said core in communication with said passage; slidable means on said supporting structure for varying the tension of said coil; a housing enclosing said supporting structure; means for conducting fluid into said coil; and means accessible, exterior of said housing, for sliding said slidable means for varying the tension of said coil.

DONALD THOMAS.

REFERENCES CITED

The following references are of record in the file of this patent:

UNITED STATES PATENTS

| Number | Name | Date |
| --- | --- | --- |
| 2,383,383 | Harding | Aug. 21, 1945 |